United States Patent [19]

Ohlin

[11] Patent Number: 5,017,067
[45] Date of Patent: May 21, 1991

[54] ANCHORING BOLT DEVICE

[75] Inventor: Stig D. Ohlin, Växjö, Sweden

[73] Assignee: Scantool Handelsbolag, Lidingö, Sweden

[21] Appl. No.: 529,574

[22] Filed: May 29, 1990

[30] Foreign Application Priority Data

May 29, 1989 [SE] Sweden .................... 8901907

[51] Int. Cl.⁵ .......................... F16B 13/06
[52] U.S. Cl. ..................... 411/45; 411/55; 411/60
[58] Field of Search .............. 411/44, 55, 60, 61, 411/271, 45, 48

[56] References Cited

U.S. PATENT DOCUMENTS 3,618,135 11/1971 Weller .................. 411/271
4,391,559 7/1983 Mizusawa ................ 411/60
4,537,542 8/1985 Pratt et al. ............... 411/55

Primary Examiner—Neill R. Wilson
Attorney, Agent, or Firm—Walter Ottesen

[57] ABSTRACT

The invention is directed to an anchoring bolt device for insertion into a material having a predrilled bore formed therein. The anchoring bolt device includes a sleeve-like body defining a longitudinal axis and having an upper portion, a mid portion and a lower portion having a bottom end face defining an opening. The body has a bore formed therein so as to extend along the axis and through the upper portion and the mid portion. A passage is formed in the lower portion of the sleeve-like body and extends from the bore and along the axis to terminate in the opening formed in the end face. The passage has a tapered inner wall surface so that the diameter of the passage becomes narrower toward the bottom end face. The lower portion of the sleeve-like body is partitioned into a plurality of legs extending in the direction of the axis. A ball is disposed in the bore so as to rest against the tapered inner wall surface and a thread is formed in the bore so as to extend along the upper portion. A fixing bolt threadably engaging this thread extends downwardly into the bore so as to be in contact engagement with the ball. The fixing bolt is rotatable so as to be displaceable along the axis between a first position wherein the ball is resting on the tapered inner wall surface and a second position wherein the bolt imparts a thrust force to the ball so as to cause the ball to press downwardly against the tapered inner wall surface thereby causing the legs to move outwardly in a direction radially of the axis and press tightly against the wall of the predrilled bore to anchor the sleeve-like body therein.

8 Claims, 1 Drawing Sheet

ANCHORING BOLT DEVICE

FIELD OF THE INVENTION

The invention relates to an anchoring bolt device which is reusable and economical to manufacture. The anchoring bolt device is adapted to be anchored in a bore which is predrilled in a rigid material such as steel, concrete or the like.

BACKGROUND OF THE INVENTION

Several types of anchoring bolt devices are known most of which comprise a screw threaded fixing bolt cooperating with an expandable body or plug made of a material such as wood, plastic or the like. When the fixing bolt is screwed into the body, the body expands against the surrounding material such as concrete, rock or metal into which a bore has been predrilled and in which the expandable body has been inserted. With this type of anchoring bolt, the expandable body is deformed when the fixing bolt is screwed thereinto. For this reason, the anchoring bolt device cannot be taken out of the predrilled bore and used again.

Another known anchoring bolt device includes a wedge-shaped expansion body which is placed in the conical portion of a tubular expandable body. The wedge-shaped expansion body is adapted to cause expansion of the expandable body against the surrounding material when driven by a threaded fixing bolt. When the fixing bolt is loosened and screwed out of the expandable body, the body has not been deformed by the bolt but it would be difficult to loosen the wedge-shaped body out of its wedged position and consequently the expandable body cannot be loosened and taken out of the predrilled bore and used again.

Still another known anchoring bolt device available commercially includes one end portion in the form of a cylindrical body having an internal thread and an other end portion in the form of a tubular split body and a cooperating fixing bolt. The fixing bolt is intended to be "drawn into" the tubular body to expand the same.

For all the anchoring devices described above, the expandable body is inserted first into a predrilled bore with the expandable portion first. The last-mentioned configuration does not permit the fixing bolt to be rotated relative to the tubular body. A threaded nut which coacts with the fixing bolt must therefore be used. This makes the anchoring device complicated and expensive even if the cost, to some extent, could be limited by the fact that the anchoring bolt device under certain circumstances can be reused.

SUMMARY OF THE INVENTION

The object of the invention is to provide an anchoring bolt device which is simple and inexpensive to produce and which, after being used, can be easily removed from a predrilled bore and used again for another fixing purpose.

The anchoring bolt device of the invention is for insertion into a material having a predrilled bore formed therein. The anchoring bolt device includes: a sleeve-like body defining a longitudinal axis and having an upper portion, a mid portion and a lower portion having a bottom end face defining an opening; the body having a bore formed therein so as to extend along the axis and through the upper portion and the mid portion; the lower portion having a passage formed therein along the axis to terminate in the opening; the opening having a diameter less than the diameter of the bore; and, the passage being defined by an inner wall surface extending from the bore and tapering downwardly to the opening; partition interface means formed at least in the lower portion for partitioning the lower portion into a plurality of legs extending in the direction of the axis; a ball disposed in the bore so as to rest against the tapered inner wall surface; a thread formed in the bore so as to extend along the upper portion; a fixing bolt threadably engaging the thread and extending downwardly into the bore so as to be in contact engagement with the ball; the fixing bolt being rotatable in the thread so as to be displaceable along the axis between a first position wherein the ball is resting on the tapered inner wall surface and a second position wherein the bolt imparts a thrust force to the ball so as to cause the ball to press downwardly against the tapered surface thereby causing the legs to move outwardly in a direction radially of the axis and press tightly against the wall of the predrilled bore so as to anchor the sleeve-like body therein.

According to another feature of the invention, the thread formed in the upper portion of the sleeve-like body is a thread produced by rolling and is formed after the ball has been placed in the bore. As the inner diameter of the rolled thread is less than that of the bore per se before the thread is formed, the ball will be trapped and kept in the lower bore and tapered portion by the rolled thread. The sleeve-like body and the ball conjointly provide a unit which is easy to handle. In addition, lower production and stock keeping costs are realized with the anchoring bolt device of the invention.

The rolled thread can also withstand a higher axial force compared to that of a conventional thread and this makes it possible to reduce the axial length of the thread formed in the upper portion of the sleeve-like body so that the overall axial length of the device is reduced. In addition to lower material costs, the anchoring bolt device permits the bore in the sleeve-like body to be drilled which reduces production costs.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
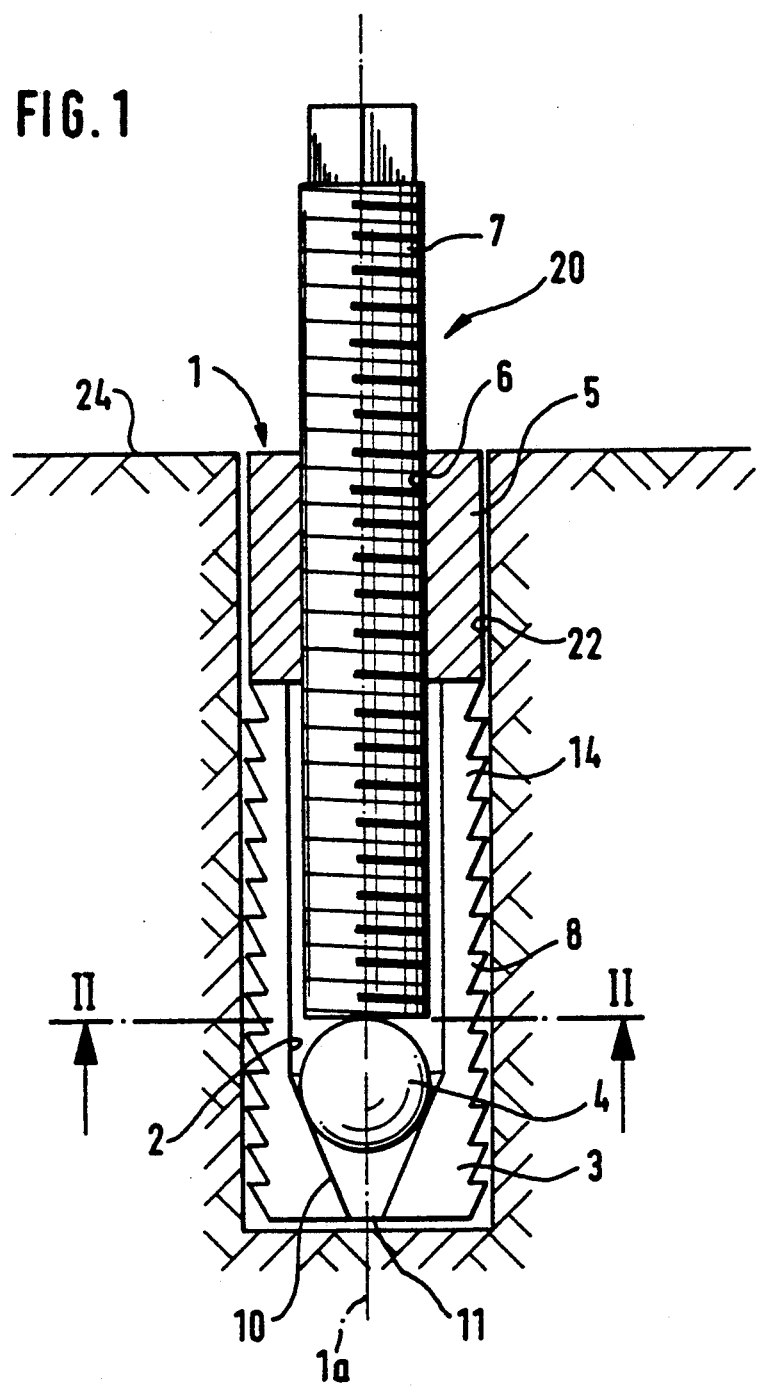
FIG. 1 illustrates an anchoring bolt device according to a preferred embodiment of the invention in longitudinal section.
Figure 2:
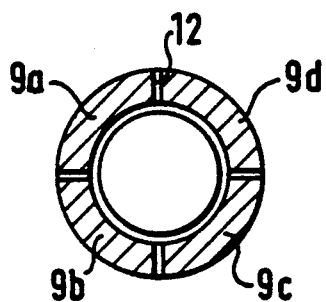
FIG. 2 is a section view taken along line II—II of FIG. 1.

In FIG. 1, the anchoring bolt device 20 of the invention is shown seated in bore 22 predrilled into a solid material 24 such as an engine block or concrete wall.

The body 1 is seated in the predrilled bore 22 and defines a longitudinal axis 1a and includes a homogeneous and cylindrical metal member in the center of which a bore 2 has been drilled axially and through almost the entire piece. The cross section of the bore 2 is tapered in the lower portion 3 of the body. That is, the bore 2 extends into a conical passage 10 which terminates in an opening 11 at the bottom of the body 1. A conical angle of about 23 degrees has been found suitable.

A steel ball 4 is inserted into the bore 2. The diameter of the ball 4 is somewhat smaller than the inner diameter of the bore 2 and it is inserted in the bore at the upper end portion 5 of the body 1.

After the ball 4 has been inserted into the bore 2 and dropped into the conical passage 10, an internal thread 6 is formed in the bore 2 in the upper end portion 5 of the body 1. The thread 6 is preferably formed by rolling which makes the inner diameter of the bore 2 smaller. Thus, by forming the thread 6 by rolling, the inner diameter of the bore 2 in the region of the thread is made smaller than a thread made in a more conventional manner such as by cutting. The inner diameter of the rolled thread 6 is less than the diameter of the ball 4 which keeps the ball 4 in the bore 2 so that the cylindrical body 1 is an easy unit to handle. In addition, the rolled thread has a greater strength than threads formed using other manufacturing processes.

The cylindrical body 1 includes a split open arrangement defined by four partition interfaces 12 in the mid portion 14 and lower portion 3 of the body. These partition interfaces 12 are slits which extend upwardly from the lower portion 3 and through most of the mid portion 14 almost up to the threaded upper end portion 5.

A threaded fixing bolt 7 which can be made of steel threadably engages the internal thread 6 and can be rotated to press downwardly on the ball 4 in order to split the lower portion 3 open and press against the wall surface of the predrilled bore 22 in which the anchoring bolt device 20 is seated.

The lower and mid portions (3 and 14) include the four quadrant legs (9a to 9d) which separate along partition interfaces 12 and expand radially when the ball 4 is forced axially into conical passage 10 by the fixing bolt 7.

During its axial downward movement against the conical surface of passage 10, the ball 4 presses out the four quadrant legs (9a to 9d) of the sleeve-like body 1 against the surrounding material in which the anchoring bolt device is intended to be anchored. To increase the friction between the body 1 and the surrounding material, the outer periphery of the legs 9 is provided with teeth 8 or some other suitable profile.

The advantage of using a ball as an expander to achieve the expansion of the sleeve-like body is that the ball, pressing against the surrounding tapered wall along a circular contact line, develops a greater radial force compared to that of a wedge, for example. Furthermore, when the fixing bolt 7 is loosened it will be very easy to loosen the ball 4 as well, because of the small contact surface and consequently the low friction between the ball and the surrounding wall. Actually, the ball 4 will be pressed back automatically to its original position by the elastic force of the split apart legs 9 which are preferably made of a material such as resilient steel. The entire sleeve-like body is preferably made of steel. After the screw 7 has been loosened and no longer applies a force to the ball 4, the sleeve-like body 1 normally takes back its original form and is therefore ready to be used again.

A further advantage of using a ball as an expander, compared, for example to a wedge, is that the ball never can move at an angle relative to the center axis 1a of the cone. Accordingly, the ball 4 will press against the conical wall surface 10 with the same pressure around its entire contact line during the whole expanding movement.

A still further advantage afforded by the ball in combination with a rolled thread is that the bore 2, drilled in the body 1, does not need to be made any wider than just allowing the ball 4 to fit into the bore 2. The diameter of the bore 2 is narrowed in the upper portion 5 by rolling the thread 6 so that this reduced diameter is less than the diameter of the ball 4 which was introduced into the bore 2 before the thread 6 was formed. Accordingly, the body 1 with the ball 4 will be one single unit after the rolled thread 6 has been formed by rolling at the upper part 5 of the cylindrical body.

Thus, the bore 2 has a first diameter and the ball 4 has a second diameter less than the first diameter. On the other hand, the inner diameter of the rolled thread 6 is less than the diameter of the ball thereby trapping the ball 4 in the bore 2.

The type and design of the fixing bolt can be selected as desired. The only requirement is that the thread of the bolt and the rolled thread 6 fit together.

It is understood that the foregoing description is that of the preferred embodiments of the invention and that various changes and modifications may be made thereto without departing from the spirit and scope of the invention as defined in the appended claims.

What is claimed is:

1. An anchoring bolt device for insertion into a material having a predrilled bore formed therein, the anchoring bolt device comprising:

a sleeve-like body defining a longitudinal axis and having an upper portion, a mid portion and a lower portion having a bottom end face defining an opening;

said body having a bore formed therein so as to extend along said axis and through said upper portion and said mid portion;

said lower portion having a passage formed therein along said axis to terminate in said opening; said opening having a diameter less than the diameter of said bore; and, said passage being defined by an inner wall surface extending from said bore and tapering downwardly to said opening;

partition interface means formed at least in said lower portion for partitioning said lower portion into a plurality of legs extending in the direction of said axis;

a ball disposed in said bore so as to rest against the tapered inner wall surface;

a thread formed in said bore so as to extend along said upper portion;

a fixing bolt threadably engaging said thread and extending downwardly into said bore so as to be in contact engagement with said ball;

said fixing bolt being rotatable in said thread so as to be displaceable along said axis between a first position wherein said ball is resting on the tapered inner wall surface and a second position wherein said bolt imparts a thrust force to said ball so as to cause said ball to press downwardly against said tapered inner wall surface thereby causing said legs to move outwardly in a direction radially of said axis and press tightly against the wall of the predrilled bore to anchor said body therein;

said bore having a first diameter and said ball having a second diameter less than said first diameter; and, said thread having an inner diameter less than said second diameter thereby trapping said ball in said bore.

2. The anchoring bolt device of claim 1, said tapered inner wall surface being a conical surface.

3. The anchoring bolt device of claim 1, said partition interface means being a plurality of slits parallel to said axis and extending through said lower portion and continuing through said mid portion of said body so as to terminate just ahead of said upper portion.

4. The anchoring bolt device of claim 3, said mid and lower portions of said body having an outer surface; and, profile means formed in said outer surface for facilitating the gripping engagement of said legs with the wall of the predrilled bore formed in said material.

5. The anchoring bolt device of claim 1 said sleeve-like body being made of a resilient material so as to permit said legs to automatically return to their initial position when said fixing bolt is displaced back to said first position removing said thrust force from said ball.

6. The anchoring bolt device of claim 1, said ball being made of steel and said sleeve-like body also being made of steel.

7. The anchoring device of claim 1, said thread being a rolled thread.

8. An anchoring bolt device for insertion into a material having a predrilled bore formed therein, the anchoring bolt device comprising:
- a sleeve-like body defining a longitudinal axis and having an upper portion, a mid portion and a lower portion having a bottom end face defining an opening;
- said body having a bore formed therein so as to extend along said axis and through said upper portion and said mid portion;
- said lower portion having a passage formed therein along said axis to terminate in said opening; said opening having a diameter less than the diameter of said bore; and, said passage being defined by an inner wall surface extending from said bore and tapering downwardly to said opening;
- partition interface means formed at least in said lower portion for partitioning said lower portion into a plurality of legs extending in the direction of said axis;
- a ball disposed in said bore so as to rest against the tapered inner wall surface;
- a fixing bolt defining an interface with said upper portion and extending downwardly into said bore along said axis so as to be in contact engagement with said ball;
- engaging means formed at said interface for removably holding said fixing bolt in said bore so as to permit said fixing bolt to be movable along said axis;
- said fixing bolt being held by said engaging means so as to be displaceable along said axis between a first position wherein said ball is resting on the tapered inner wall surface and a second position wherein said bolt imparts a thrust force to said ball so as to cause said ball to press downwardly against said tapered inner wall surface thereby causing said legs to move outwardly in a direction radially of said axis and press tightly against the wall of the predrilled bore to anchor said body therein;
- said bore having a first diameter and said ball having a second diameter less than said first diameter; and,
- said engaging means being formed at said interface so as to have a diameter less than said second diameter thereby trapping said ball in said bore.

* * * * *